United States Patent [19]
Streiter

[11] Patent Number: 6,000,702
[45] Date of Patent: Dec. 14, 1999

[54] ACTIVE VEHICLE SUSPENSION SYSTEM

[75] Inventor: Ralph Streiter, Stuttgart, Germany

[73] Assignee: DaimlerChrysler AG, Stuttgart, Germany

[21] Appl. No.: 09/175,362

[22] Filed: Oct. 20, 1998

Related U.S. Application Data

[63] Continuation of application No. PCT/EP97/01614, Apr. 1, 1997, abandoned.

[30] Foreign Application Priority Data

Apr. 20, 1996 [DE] Germany ............................ 196 15 737

[51] Int. Cl.$^6$ ................................................. B60G 17/015
[52] U.S. Cl. ..................................... 280/5.507; 280/5.514; 701/38
[58] Field of Search .............................. 280/5.507, 5.514, 280/5.508, 5.513; 701/38

[56] References Cited

U.S. PATENT DOCUMENTS

| | | | |
|---|---|---|---|
| 5,295,074 | 3/1994 | Williams | 280/5.507 |
| 5,475,593 | 12/1995 | Townend | 280/5.507 |
| 5,619,413 | 4/1997 | Oakley | 280/5.514 |
| 5,743,553 | 4/1998 | Nagel et al. | 280/5.507 |

FOREIGN PATENT DOCUMENTS

| | | |
|---|---|---|
| 39 32 476 | 4/1990 | Germany . |
| 41 38 831 | 6/1992 | Germany . |
| 41 39 412 | 6/1992 | Germany . |
| 42 17 325 | 12/1993 | Germany . |
| 43 23 552 | 1/1994 | Germany . |
| 42 31 641 | 3/1994 | Germany . |
| 43 03 160 | 8/1994 | Germany . |
| 44 14 022 | 10/1995 | Germany . |
| 08 099519 | 8/1996 | Japan . |
| 2 255 056 | 10/1992 | United Kingdom . |
| 2 271 535 | 4/1994 | United Kingdom . |

OTHER PUBLICATIONS

Patent Abstracts of Japan, Publication No. 62198510, Sept. 2, 1987.

*Primary Examiner*—Peter C. English
*Attorney, Agent, or Firm*—Evenson, McKeown, Edwards & Lenahan, P.L.L.C.

[57] ABSTRACT

An active suspension system, particularly for vehicles, having supporting units which each have an actively lift-adjustable regulating unit and a passive spring arranged in series thereto. Preferably, a damper is arranged at least in parallel to the spring. By use of various acceleration sensors, lifting, pitching, rolling, longitudinal and lateral accelerations of the vehicle body can be determined. By use of path sensors, the lifting positions of the supporting units are registered. A signal analysis permits the achievement of a definable suspension characteristic.

15 Claims, 3 Drawing Sheets

ACTIVE VEHICLE SUSPENSION SYSTEM

CROSS-REFERENCE TO RELATED APPLICATIONS

This application is a continuation of PCT Application No. PCT/EP97/01614 filed on Apr. 1, 1997, now abandoned.

This application claims the priority of German patent application No. 196 15 737.4, filed Apr. 20, 1996, the disclosure of which is expressly incorporated by reference herein.

BACKGROUND OF THE INVENTION

The invention relates to an active suspension system, particularly for vehicles, having supporting units, which each have an actively lift-adjustable regulating unit and a passive spring arranged in series thereto, and having an automatic control of the regulating units, a path sensor for generating a signal correlated with the lifting position of the supporting unit being assigned to each supporting unit, and an arrangement of acceleration sensors being provided on the vehicle body for generating signals for body-side longitudinal and lateral accelerations as well as lifting movements, and control signals used for controlling the regulating units comprising a first proportion generated by signals of acceleration sensors and a second proportion generated by signals of path and acceleration sensors.

A suspension system of the type generally described above is the object of German Patent Document DE 39 32 476 A1. According to this document, hydropneumatic spring and supporting units are provided in the case of which the passive spring is formed by a pneumatic spring loading device. This spring is hydraulically connected with a piston working space of a piston-cylinder unit arranged between the sprung and the unsprung mass, in which case the hydraulic "linkage" formed by the hydraulic connection can be lengthened or shortened by the feeding or removal of hydraulic medium.

The first proportion of the control signals is determined by the longitudinal and lateral acceleration by the vehicle body. The second proportion of the control signals depends on the lifting path of the unsprung mass relative to the sprung mass as well as the vertical acceleration of the sprung mass.

German Patent Document DE 42 31 641 A1 as well as German Patent Document DE 44 14 022 A1 show active suspension systems, in which a passive mechanical spring is arranged in series to a hydraulic regulating unit by means of which the lifting position of the unsprung mass can be changed relative to the sprung mass or lift adjustments can be generated which are superimposed on the spring lift of the passive spring.

From German Patent Document DE 41 39 412 A1, an active suspension system is known in which small, obviously hard passive springs are provided which are constructed only for influencing higher-frequency movements of the tire or wheel, which have lower amplitudes, and are constructed as hydropneumatic springs. These springs are combined with adjustable dampers.

German Patent Document DE 42 17 325 A1 relates to an active vehicle suspension in the case of which individual natural vibration forms of the body can be influenced separately from one another in the sense of a "Skyhook" damping.

According to German Patent Document DE 29 43 486 C2, it is provided to assign to each supporting unit of an active suspension system, in the case of which one lift-adjustable regulating unit respectively is arranged in series to a passive suspension; a path sensor for determining the regulating path of the regulating unit; as well as a vehicle-body-side acceleration generator for determining the body-side vertical acceleration. From the signals of the acceleration generator, in addition to the acceleration signals, other signals are determined by calculation for the vertical velocity and the vertical position of the vehicle body. The regulating units are then in each case controlled as a function of their lifting position as well as of the signals for the vertical acceleration, the vertical velocity and the vertical position of the vehicle body. As a result, a good damping of the vehicle body movements is endeavored.

In addition, it is basically known, for example, from German Patent Document DE 43 03 160 A1 to provide, in the case of chassis systems, only one actively controllable regulating unit respectively between the vehicle body and the wheel, without providing an additional passive spring arranged in series with the regulating unit and to carry out the controlling of these regulating units as a function of parameters to be monitored by means of a desired-value/actual-value comparison. Systems of this type must have an extremely high reaction capacity of the regulating units as well as of the regulating paths. Otherwise, because of the lack of flexible passive elements between the wheel and the vehicle body, the suspension action would be extremely uncomfortable.

SUMMARY OF THE INVENTION

It is an object of the present invention to provide an active suspension system which is capable of offering a high driving safety with a good comfort while the energy requirements are comparatively low.

This and other objects have been achieved according to the present invention by providing an active suspension system for a vehicle, comprising: a plurality of supporting units, each of said supporting units having an actively lift-adjustable regulating unit and a passive spring arranged in series thereto; an automatic control for the regulating units; a path sensor which generates a signal corresponding to a lifting position of the supporting unit being assigned to each supporting unit; and an arrangement of acceleration sensors provided on the vehicle body which generate signals for body-side longitudinal and lateral accelerations and lifting movements, wherein control signals used for controlling the regulating units comprise a first proportion generated by signals of said acceleration sensors and a second proportion generated by signals of said path and acceleration sensors, the first proportion being determined by pitching, rolling and lifting movements of the vehicle body determined by the acceleration sensors, and the second proportion being determined by a comparison of definable desired values for a position of the vehicle body relative to the ground with assigned actual values which are mathematically determined from the lifting positions of the supporting units and at least the vehicle body accelerations in the longitudinal and lateral directions.

This and other objects have been achieved according to the present invention by providing a method of controlling an active suspension system for a vehicle having a plurality of supporting units, each of said supporting units having an actively lift-adjustable regulating unit and a passive spring arranged in series thereto, said method comprising the acts of: generating signals corresponding to lifting positions of the supporting units via respective path sensors assigned to said supporting units; generating signals for body-side longitudinal and lateral accelerations and lifting movements via an arrangement of acceleration sensors provided on the vehicle body; controlling the regulating units based on a control signal comprising a first proportion generated by signals of said acceleration sensors and a second proportion generated by signals of said path and acceleration sensors, determining the first proportion based on pitching, rolling and lifting movements of the vehicle body determined by the acceleration sensors, and determining the second proportion based on a comparison of definable desired values for a position of the vehicle body relative to the ground with assigned actual values which are mathematically determined from the lifting positions of the supporting units and at least the vehicle body accelerations in the longitudinal and lateral direction.

This and other objects have been achieved according to the present invention by providing a computer software product for controlling an active suspension system for a vehicle having a plurality of supporting units, each of said supporting units having an actively lift-adjustable regulating unit and a passive spring arranged in series thereto, said software product comprising a computer readable medium, said computer readable medium having stored thereon code segments which: detect lifting positions of the supporting unit via respective path sensors assigned to said supporting units; detect body-side longitudinal and lateral accelerations and lifting movements via an arrangement of acceleration sensors provided on the vehicle body; control the regulating units based on a control signal comprising a first proportion generated by signals of said acceleration sensors and a second proportion generated by signals of said path and acceleration sensors, determine the first proportion based on pitching, rolling and lifting movements of the vehicle body determined by the acceleration sensors, and determine the second proportion based on a comparison of definable desired values for a position of the vehicle body relative to the ground with assigned actual values which are mathematically determined from the lifting positions of the supporting units and at least the vehicle body accelerations in the longitudinal and lateral direction.

In the invention, typically only those sensors are used which are available at comparatively reasonable prices; that is, path sensors for the distance between the wheel and the vehicle body as well as various body-side acceleration sensors. In this case, on the one hand, by use of the acceleration sensors, the movements of the body relative to an earth-fixed reference system (inertial system) connected with the vehicle body accelerations are analyzed and, in addition, signals are analyzed which correlate with the ground clearance of the vehicle body at the wheels.

The invention is based on the general idea of providing, in the case of the control signals controlling the regulating units, on the one hand, a proportion which—considered separately—would lead to a minimization of the vehicle body movements relative to the inertial system. On the other hand, another signal proportion is taken into account which considered separately—would minimize the deviations between the actual position of the vehicle body and a desired position relative to the respective road.

In this case, the invention utilizes the recognition that the compression condition of the spring elements existing in or on a vehicle wheel, particularly of the tire spring, is correlated with the vehicle body accelerations. When the useful load of a vehicle remains essentially fixed to the vehicle and the inert mass of the vehicle wheels as well as the wheel suspensions is low in comparison to the inert mass of the vehicle body, the vehicle body accelerations in the case of a vehicle are virtually determined only by the forces acting between the road and the vehicle body which must necessarily be effective at the wheels and thus at the wheel spring and the like. The acceleration signals of the vehicle body correspondingly also represent the condition of the tire spring, and the like. As the result of the additive linking, which is provided according to the invention in the case of the second proportion of control signals, of signals for the vehicle body acceleration and path generator signals for the lifting position of the supporting units, signals will then be available which reflect the ground clearance of the vehicle body taking into account the condition of the tire spring. Since in this context particularly the often longer-lasting—for example, during braking or acceleration maneuvers or during a cornering of a vehicle—longitudinal and lateral accelerations of the vehicle body are taken into account, the deformations of the tires are considered which are particularly pronounced during these vehicle body accelerations and often last longer.

Due to the additive superimposition of these signal proportions with optionally parameter-dependent weighting factors, an optimum balance can be achieved between the reduction of the vehicle body movements and a faster adaptation of the body position to the road profile.

Another advantage of the invention is the fact that the information required for the automatic control of the regulating units can be made available directly with the sensor signals without any time-consuming signal processing.

The pitching, rolling and lifting movements of the vehicle body may be determined, for example, by use of a plurality (for example, at least three) vertical acceleration sensors which, when viewed from above the vehicle, are arranged in different positions relative to the center of gravity of the vehicle. A signal concerning the lifting movement can then be generated by the summation of the signals of these sensors (by using weighting factors depending on the position of the sensors). A signal which is correlated with the pitching movement can be generated by forming the difference between the signals of two vertical acceleration sensors arranged differently in the longitudinal direction of the vehicle. When the signals of two vertical acceleration sensors arranged differently in the transverse direction of the vehicle are superimposed on one another in the sense of a subtraction, a signal will be available which is correlated with the rolling movement.

Furthermore, it is an advantage of the invention that no disturbing signal noise can occur because of the illustrated direct analysis of the sensor signal.

A special advantage of the system according to the invention is the fact that the signal proportion derived from the pitching, rolling and lifting accelerations of the body as well as the proportion of the control signals for the regulating units derived from the ground clearances of the vehicle body represent a measurement of their control velocity. When the regulating units are constructed as hydraulic units and are controlled by customary electromagnetic valves, the mentioned control signals can directly control the electric valve current because, in the case of normal arrangements, the electric valve current is proportional to the control velocity of the hydraulic unit, provided that approximately constant pressure conditions exist at the high-pressure and at the low-pressure connection. Such a hydraulic pressure supply can easily be implemented in a basically known manner.

According to a preferred embodiment of the invention, the suspension system is designed such that, when the regulating units are stopped, there is a high progressivity of the supporting forces of the supporting units in order to be able to minimize pitching and rolling inclinations of the vehicle body relative to the road only by stopping the regulating units. Correspondingly, for a possible pitching or rolling compensation, the regulating units must carry out only slight regulating strokes at a correspondingly low regulating velocity. If a pitching or rolling inclination of the vehicle body is to be absorbed in a soft manner, it will be sufficient to switch the regulating units to be flexible; that is, in the case of hydraulic regulating units, under the effect of the external forces, hydraulic medium can be discharged by opening corresponding valves. On the whole, only little energy is therefore required for a pitching and rolling compensation as well as a comfortable pitching and rolling damping.

The hard adjustment of the passive springs also has advantages when damping vehicle-body-side suspension movements. In order to achieve a comfortable suspension system on the whole, it is sufficient to switch, in the event of a compression stroke of a wheel, the regulating unit again to flexible in order to be able to softly absorb the compression shock.

In this context, the soft setting of the optionally existing dampers is advantageous. The reason is that dampers which are hard with respect to compression strokes would counteract the flexibility which is desirable for the comfort.

In the case of the rebounding stroke, which follows, the regulating unit, which during the preceding compression stroke was switched to flexible, can actively follow comparatively slowly in the rebounding direction. On the one hand, this reduces the energy demand for the operation of the regulating unit; and, on the other hand, the supporting unit in this manner acts similarly to a well adjusted passive suspension whose damper is set to be hard in the rebounding direction (tension stage of the damper) in a currently customary manner in comparison to its action in the compression direction (pressure stage of the damper).

Other objects, advantages and novel features of the present invention will become apparent from the following detailed description of the invention when considered in conjunction with the accompanying drawings.

DETAILED DESCRIPTION OF THE DRAWINGS

Figure 1:
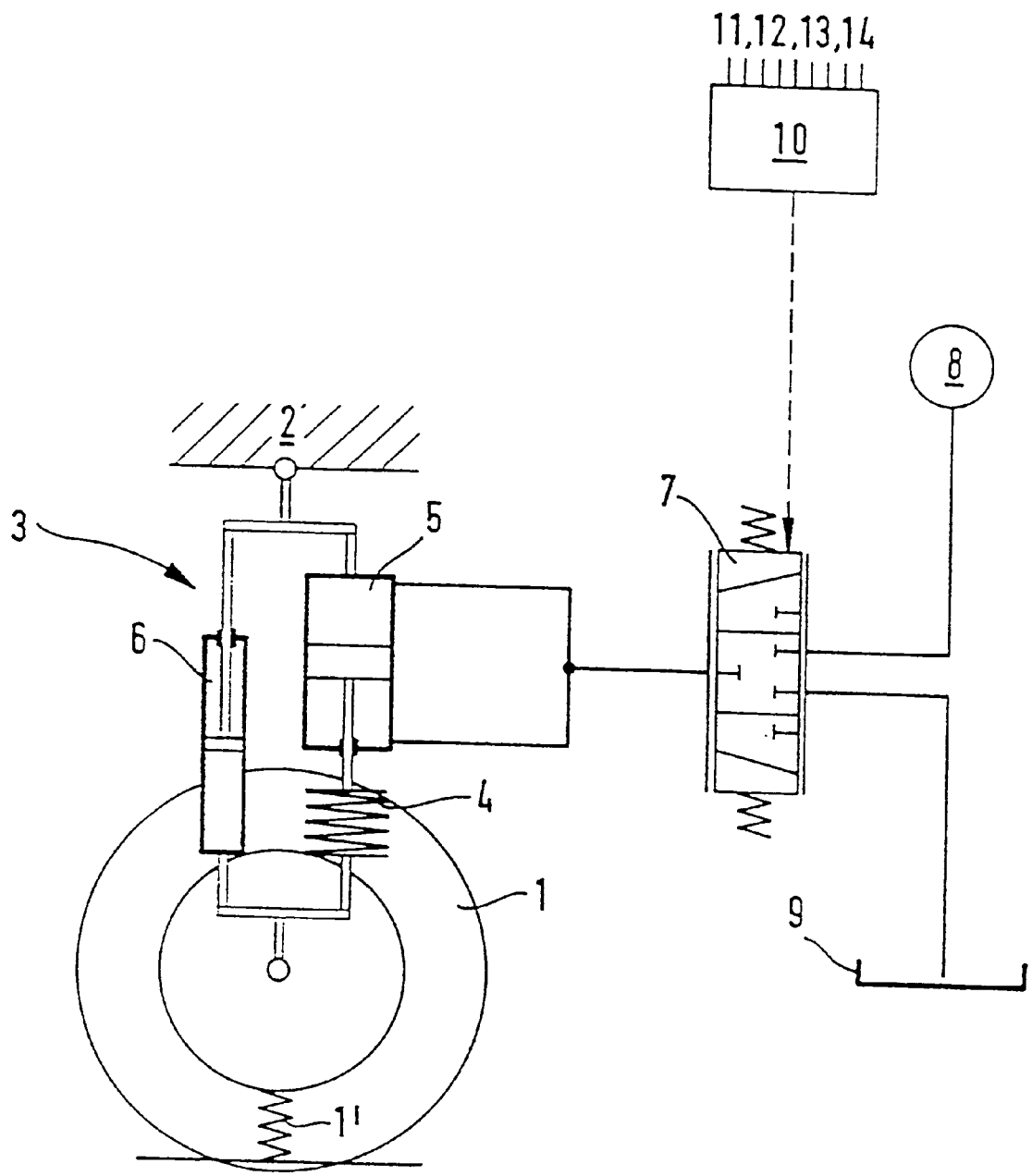
FIG. 1 is a schematic view of a supporting unit used in the present invention.
Figure 2:
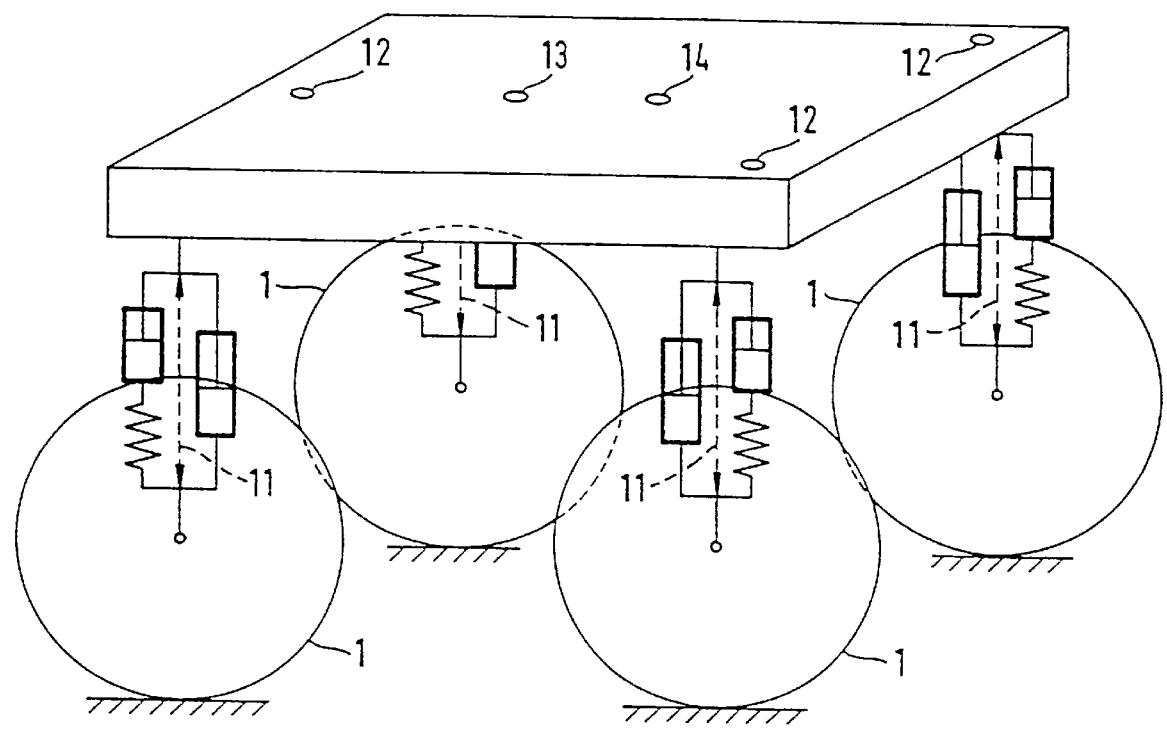
FIG. 2 is a schematic view of a vehicle having a suspension system according to a preferred embodiment in the present invention.

A supporting unit 3 in each case arranged between a wheel 1 and the chassis or body 2 of a vehicle has a passive spring 4 as well as a hydraulic unit 5 which is arranged in series thereto and which is provided in FIG. 1 according to a preferred embodiment of the invention on the vehicle body side with respect to the spring 4. The vehicle-body-side abutment of the spring 4 can be vertically adjusted relative to the vehicle body 2 via the hydraulic unit 5.

A damper 6 is arranged between the wheel 1 and the vehicle body 2 in parallel to the spring 4 or, as illustrated in FIG. 1, in parallel to the spring 4 and the hydraulic unit 5. The illustrated arrangement of the damper 6 therefore offers an advantage in that the damper 6 can be constructed with a larger length than would be the case if the damper 6 were arranged only in parallel to the spring 4 between the wheel 1 and the hydraulic unit 5. Nevertheless, this latter arrangement is also contemplated and is also advantageous because then, in the case of an adjustment, the supporting unit 3 need not work against the resistance of the damper 6.

In a controllable manner by way of an electrically operated proportional valve arrangement 7, the hydraulic unit 5 can be connected with a hydraulic pressure source 8, which may be constructed as a hydraulic pressure accumulator continuously held at an approximately constant pressure by way of a hydraulic pump which is not shown, and/or with a relatively pressureless reservoir 9, or can be blocked with respect to the pressure source 8 as well as with respect to the reservoir 9, in which case a slight leakage may occur, however.

The proportional valve arrangement 7 is operated by an electronic control circuit 10 in a manner further described below. For this purpose, the control circuit 10 is connected on the input side with the sensors listed in the following.

A path sensor 11 is assigned to each wheel or supporting unit 3 whose signal is correlated with the distance between the wheel 1 and the vehicle body 2. Instead of a direct measurement of the distance between a vehicle-body-side point and a wheel-side point, the distance can also be determined by measuring the pivot angle of a control arm, for example, of a transverse link, which is used for the wheel guiding and is assigned to the wheel 1, relative to the vehicle body 2. These distances are at least available as information for the control circuit 10.

At least three vertical acceleration sensors 12 are arranged at the vehicle body and, when viewed from above, are located at different positions with respect to the center of gravity of the vehicle body. From the signals of these sensors 12; the control circuit 10 can determine and differentiate from one another accelerations of the vehicle body 2 in the vertical direction, that is, lifting accelerations as well as accelerated pitching and rolling movements of the vehicle body 2; in other words, accelerated rotational movements about the longitudinal and transverse axes of the vehicle body 2. If one of the vertical acceleration sensors 12 is arranged at the center of gravity of the vehicle body 2, the signal of this sensor, considered separately, corresponds to the vertical acceleration of the vehicle body. If the three sensors 12 all have a more or less large distance, when viewed from above the body 2, from its center of gravity, the sum of the signals of these sensors 12 is correlated with the vertical acceleration of the vehicle body. The signal difference between two sensors 12 which have different positions in the longitudinal direction of the vehicle is correlated with the pitching acceleration (acceleration of a pitching movement) of the vehicle body. The signal difference between two sensors 12 arranged in different positions in the lateral direction of the vehicle is correlated with the rolling acceleration of the vehicle body.

Furthermore, a sensor arrangement 13 for the lateral acceleration of the vehicle body 2 as well as a sensor arrangement 14 for the longitudinal acceleration of the vehicle body 2 are arranged on the vehicle body 2.

Signals are therefore available for an acceleration of the vehicle body in the longitudinal, the lateral and the vertical direction as well as for accelerated rotational movements of the vehicle body with respect to the longitudinal, transverse and vertical axes.

Figure 3:
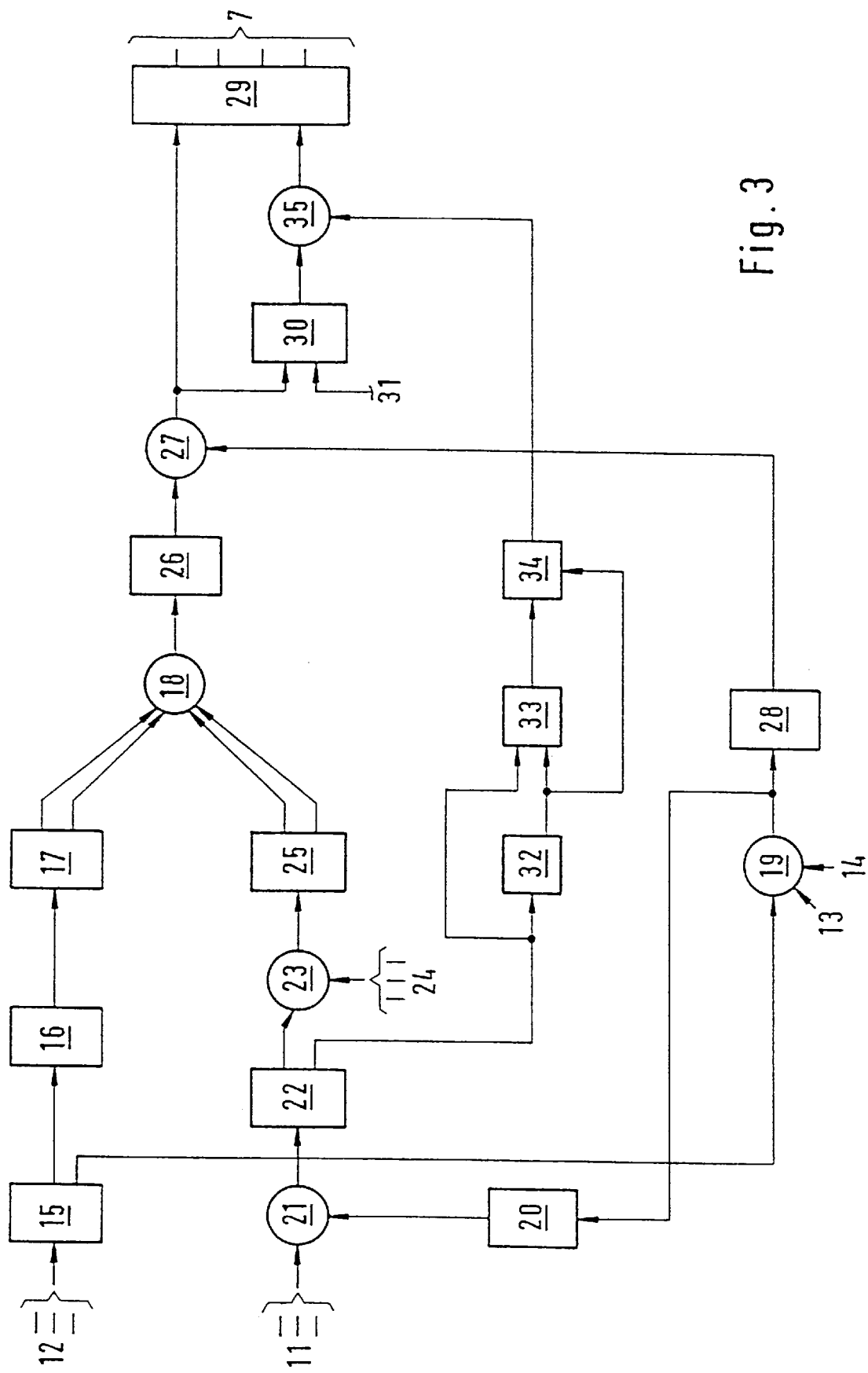
FIG. 3 is a block diagram of the automatic control for the lift-adjustable regulating units.

According to FIG. 3, the signals of the vertical acceleration sensors 12 are processed by a circuit unit 15 such that signals are present at the output side of this unit 15 which reflect the lifting acceleration, the pitching acceleration as well as the rolling acceleration of the vehicle body 2. According to a characteristic of the invention preferred for road vehicles, these signals are then fed to a high-pass filter arrangement 16 so that only signals with transient proportions of lifting, pitching and rolling accelerations of the vehicle body are present on the output side of this filter arrangement 16.

These signals are fed to a control circuit unit 17 which in the illustrated example has two outputs which lead to a summation circuit 18. One output carries a signal which is proportional to the input of the control circuit unit 17 and which is physically correlated with a desired damping of the respective accelerated vehicle body movement. The second output generates signals which correspond to the time integral of the input signals and physically represent a desired counterforce which is to counteract the respective acceleration movement of the vehicle body.

In addition, the output signals of the circuit unit 15 are fed to a summation circuit 19 which also receives the signals of the sensor arrangements 13 and 14 for the lateral and longitudinal acceleration of the vehicle body 2. On the output side of the summation circuit 19, information is therefore available concerning the vehicle body accelerations with respect to all degrees of freedom of the vehicle body 2. From a physical point of view, these signals are also a measurement of the external forces acting upon the vehicle body 2, at least if the movements of the useful load or of the occupants of a vehicle are negligible. In the case of a road vehicle, these external forces must become effective virtually completely at the wheels and correspondingly lead to an analogous compression or distortion of the tires or of the wheels 1. By means of a circuit unit 20, the above-mentioned acceleration signals can now be transformed into signals which reflect the compression condition of the tires, that is, of the "tire spring" 1' formed by the tires of the wheels 1. These signals are fed to a summation circuit 21 and are linked there with the signals of the path sensors 11 such that signals exist on the output side which are correlated with the ground clearances of the vehicle body 2 at the respective wheels 1. In their totality, these signals therefore represent information concerning the position of the vehicle body 2 relative to the road.

In the circuit unit 22, these signals are transformed such that signals are available on the output side which are correlated with the actual value of the median ground clearance of the vehicle body 2, the actual value of the rolling angle as well as the actual value of the pitching angle of the vehicle body 2.

Now the above-mentioned signals are fed to a summation circuit 23 which receives desired value signals from desired value generators 24 for the median ground clearance as well as the pitching angle and the rolling angle of the vehicle body 2 and carries out a desired value—actual value comparison. Thus the summation circuit 23 generates signals on the output side which represent the desired value—actual value deviations of the actual position of the vehicle body 2 with respect to its desired position.

The output signals of the summation circuit 23 are then processed in a control circuit unit 25 with two outputs in basically the same manner as the signals fed to the control circuit unit 17. One output of the control circuit unit 25 therefore generates output signals which are proportional to the input signals while another output of the control circuit unit 25 generates signals which correspond to the time integral of the input signals.

The output signals of the control circuit unit 25 are combined in the summation circuit 18 with the output signals of the control circuit unit 17; that is, a totality of signals is available on the output side of the summation circuit 18 which, on the one hand, comprises the desired countermeasures against the vehicle body movements relative to an earth-fixed reference system as well as countermeasures for compensating deviations between the actual position of the vehicle body relative to the ground and corresponding desired values. These signals are fed to a low-pass filter arrangement 26 in order to avoid vehicle body vibrations, which are caused by engine vibrations, or wheel vibrations caused by wheel imbalances, to be taken into account when operating the proportional valve arrangements 7.

Behind the low-pass filter, another summation circuit 27 is preferably arranged which, in addition to the output signals of the low-pass filter 26, receives the output signals of a differentiating arrangement 28 which, on the input side, receives the output signals of the summation circuit 19. Correspondingly, the output signals of the differentiating arrangement 28 represent the changes of signals which, correlated with external movements acting on the vehicle body 2 in the lifting and rolling direction, are composed of the changes of the lifting, pitching, rolling, lateral and longitudinal accelerations of the vehicle body.

The output signals of the summation circuit 27 therefore contain signal proportions which are defined by movement velocities of the vehicle body 2. Furthermore, the output signals of the summation circuit 27 comprise signal proportions which are determined by the external movements in the pitching and rolling direction acting upon the vehicle body 2. Finally, signal proportions exist which are defined by the deviation of the actual position of the vehicle body relative to the ground with respect to a corresponding desired position.

In a final stage 29, these signals are now converted into electric control currents for the proportional valve arrangements 7 of the wheels 1 of the vehicle.

In this case, the adjustments of the hydraulic units 5 provided for the compensation of the rolling movements of the vehicle body 2 may act in a definable manner non-uniformly onto the front wheels and rear wheels of the vehicle. For this purpose, signal proportions provided for compensating the rolling may be fed to a control circuit 30 which is connected with a desired-value generator 31 which defines the distribution of the movements of the hydraulic units 5 provided for compensating the rolling to the front wheels and the rear wheels. As a result, the final stage 29, which is connected by way of another input with the output of the control circuit 30, can take into account for compensating the rolling, a corresponding distribution when operating the proportional valve arrangements 7.

According to a particularly preferred embodiment, the circuit unit 22 can generate from the input signals also a signal which reflects to which extent the mean value of the ground clearances of the vehicle body 2 on one set of wheels 1 situated diagonally opposite one another (right front wheel, left rear wheel) deviates from the mean value of the ground clearances at the other mutually diagonally opposite set of wheels 1 (left front wheel, right rear wheel). This signal graphically represents a measurement of the extent and the direction of the distortion of the vehicle body 2. The corresponding signals may be fed to a filter 32 which delays these signals by a predetermined extent. The output signal of the filter is fed to a discriminator circuit 33 which has another input which is connected with the input of the filter 32. The discriminator circuit 33 generates an output signal with the value "1" when the signals at the two inputs of the discriminator circuit 33, that is, the filter input signal and the filter output signal, have the same polarity or the same preceding sign. Otherwise, an output signal is generated which has the value "0". This output signal is multiplied in a multiplier circuit 34 with the filter output signal. As a result, the filter output signal on the output side of the multiplier circuit 34 is therefore transmitted only if it has the same polarity or the same preceding sign as the filter input signal. Otherwise, the filter output signal is not transmitted.

The output signal of the multiplier circuit 34 can therefore be present only if when an actual distortion of the vehicle body 2 corresponds with respect to the preceding sign to the distortion of the vehicle body 2 averaged with respect to time by the circuit 32. In this manner, the intervention frequency of the active control elements because of an actually existing distortion can be reduced to a minimum without endangering the actual function—specifically the minimizing of the distortion.

By means of a summation circuit 35, the already existing distortion of the vehicle body 2 can be taken into account when compensating the rolling.

It is a special advantage of the invention that, in the case of customary combinations of the proportional valve arrangement 7 and the hydraulic unit 5, the regulating velocity of the hydraulic unit 5 is proportional to the electric current which operates the proportional valve arrangement 7. This applies at least when the pressure of the pressure source 8 is high in comparison to the forces effective at the hydraulic units 5. Such conditions can easily be met. Correspondingly, in the case of the system according to the invention, it can always be assumed that the regulating velocity of a hydraulic unit 5 corresponds to the electric current for operating the assigned proportional valve arrangement 7. This results in a precisely reproducible response behavior.

On the other hand, in the case of a system of the type according to the invention, a defined suspension characteristic can always be achieved by a corresponding dimensioning of the circuit elements if it can be assumed that the electric currents generated by the final stage 29 for operating the proportional valve arrangements 7 are proportional to the regulating velocities of the respective hydraulic units 5.

The instant invention includes a computer software product comprising a computer readable medium having stored thereon code segments which control an active suspension system according to the method described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An active suspension system for a vehicle, comprising:
    a plurality of supporting units, each of said supporting units having an actively lift-adjustable regulating unit and a passive spring arranged in series thereto;
    an automatic control for the regulating units;
    a path sensor for each supporting unit which generates a signal corresponding to a lifting position of the respective supporting unit; and
    an arrangement of acceleration sensors provided on a body of the vehicle which generate signals for body-side longitudinal and lateral accelerations and lifting movements,
    wherein control signals used for controlling the regulating units comprise a first proportion generated by signals of said acceleration sensors and a second proportion generated by signals of said path and acceleration sensors,
    the first proportion being determined by pitching, rolling and lifting movements of the vehicle body determined by the acceleration sensors, and
    the second proportion being determined by a comparison of definable desired values for a position of the vehicle body relative to the ground with assigned actual values which are mathematically determined from the lifting positions of the supporting units and at least the vehicle body accelerations in the longitudinal and lateral directions.

2. A suspension system according to claim 1, wherein a damper is arranged in parallel to each of the passive springs or in parallel to each of the regulating units and the respective passive spring.

3. A suspension system according to claim 2, wherein each of the dampers is relatively soft.

4. A suspension system according to claim 1, wherein each of the passive springs is relatively hard.

5. A suspension system according to claim 4, wherein a damper is arranged in parallel to each of the passive springs or in parallel to each of the regulating units and the respective passive spring, and wherein the damper is relatively soft.

6. A suspension system according to claim 1, wherein the control signals further comprise a proportion which depends on an extent of change of the vehicle body acceleration.

7. A suspension system according to claim 1, wherein the signals used for generating the first signal proportion pass through a high-pass filter.

8. A suspension system according to claim 1, wherein the first and second signal proportions pass through a low-pass filter.

9. A suspension system according to claim 1, wherein said regulating units comprise hydraulic units which are controlled by electrically operated proportional valve arrangements, a regulating velocity of the hydraulic units being proportional to an electric current for operating the respective proportional valve arrangements.

10. A method of controlling an active suspension system for a vehicle having a plurality of supporting units, each of said supporting units having an actively lift-adjustable regulating unit and a passive spring arranged in series thereto, said method comprising the acts of:
    generating signals corresponding to lifting positions of the supporting units via respective path sensors assigned to said supporting units;
    generating signals for body-side longitudinal and lateral accelerations and lifting movements via an arrangement of acceleration sensors provided on a body of the vehicle;
    controlling the regulating units based on control signals comprising a first proportion generated by signals of said acceleration sensors and a second proportion generated by signals of said path and acceleration sensors,
    determining the first proportion based on pitching, rolling and lifting movements of the vehicle body determined by the acceleration sensors, and
    determining the second proportion based on a comparison of definable desired values for a position of the vehicle body relative to the ground with assigned actual values which are mathematically determined from the lifting positions of the supporting units and at least the vehicle body accelerations in the longitudinal and lateral directions.

11. A method according to claim 10, wherein the control signals further comprise a proportion which depends on an extent of change of the vehicle body acceleration.

12. A method according to claim 10, further comprising passing the signals used for generating the first signal proportion through a high-pass filter.

13. A method according to claim 10, further comprising passing the first and second signal proportions through a low-pass filter.

14. A method according to claim 10, wherein said regulating units comprise hydraulic units which are controlled by electrically operated proportional valve arrangements, said method further comprising the act of regulating a velocity of the hydraulic units proportionally to an electric current for operating the respective proportional valve arrangements.

15. A computer software product for controlling an active suspension system for a vehicle having a plurality of supporting units, each of said supporting units having an actively lift-adjustable regulating unit and a passive spring arranged in series thereto, said software product comprising a computer readable medium, said computer readable medium having stored thereon code segments which:

detect lifting positions of the supporting units via respective path sensors assigned to said supporting units;

detect body-side longitudinal and lateral accelerations and lifting movements via an arrangement of acceleration sensors provided on a body of the vehicle;

control the regulating units based on control signals comprising a first proportion generated by signals of said acceleration sensors and a second proportion generated by signals of said path and acceleration sensors, determine the first proportion based on pitching, rolling and lifting movements of the vehicle body determined by the acceleration sensors, and determine the second proportion based on a comparison of definable desired values for a position of the vehicle body relative to the ground with assigned actual values which are mathematically determined from the lifting positions of the supporting units and at least the vehicle body accelerations in the longitudinal and lateral directions.

* * * * *